United States Patent [19]

Jackson, Jr. et al.

[11] Patent Number: 5,066,766

[45] Date of Patent: Nov. 19, 1991

[54] PROCESS FOR THE PREPARATION OF POLY(ESTER-CARBONATES)

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 508,756

[22] Filed: Apr. 13, 1990

[51] Int. Cl.$^5$ .................... C08G 63/02; C08G 63/00; C08G 67/00; C08G 69/00

[52] U.S. Cl. .................................. 528/190; 528/176; 528/179; 528/180; 528/181; 528/193; 528/194; 528/271; 528/272

[58] Field of Search ............... 528/176, 179, 180, 181, 528/190, 193, 194, 271, 272

[56] References Cited

U.S. PATENT DOCUMENTS

| | | | |
|---|---|---|---|
| 4,107,143 | 8/1978 | Inata et al. | 528/176 |
| 4,398,018 | 8/1983 | Akkapeddi et al. | 528/191 |
| 4,435,561 | 3/1984 | Lai et al. | 528/193 |
| 4,612,362 | 9/1986 | Lai et al. | 528/190 |

FOREIGN PATENT DOCUMENTS 303931 2/1989 European Pat. Off. .
303935 2/1989 European Pat. Off. .

*Primary Examiner*—John Kight, III
*Assistant Examiner*—Terressa M. Mosley
*Attorney, Agent, or Firm*—J. Frederick Thomsen; William P. Heath, Jr.

[57] ABSTRACT

Disclosed is a process for the preparation of poly(ester-carbonates) wherein (1) an aromatic diol, (2) methyl phenyl carbonate and (3) an alkyl carboxylate ester component selected from an aromatic dicarboxylate ester, a hydroxy aromatic carboxylate ester or a mixture thereof are contacted in the presence of a transesterification/polycondensation catalyst under transesterification/polycondensation conditions of pressure and temperature.

6 Claims, No Drawings

PROCESS FOR THE PREPARATION OF POLY(ESTER-CARBONATES)

This invention pertains to a novel process for the preparation of poly(ester-carbonates) from aromatic diols and at least one aromatic dicarboxylate diester and/or at least one hydroxyaromatic carboxylate ester. More specifically, this invention pertains to the preparation of poly(ester-carbonates) by the reaction of such aromatic diols and esters with methyl phenyl carbonate in the presence of a transesterification/polycondensation catalyst or catalyst system.

European Patent Application 303,931 discloses a process for preparing thermotropic, wholly-aromatic polyesters and poly(ester-carbonates) by esterifying an optionally-substituted hydroxybenzoic acid and an aromatic dicarboxylic acid with a diaryl carbonate and subsequently transesterifying the resulting diaryl esters with an aromatic diol, optionally in the presence of a catalyst consisting of heterocyclic compounds containing 1 to 3 nitrogen atoms. A similar process is described in European Patent Application 303,935 wherein the aryl esters formed in the first stage of the process are transesterified with an aromatic diol, additional diaryl carbonate, and, optionally, a chain terminator.

U.S. Pat. No. 4,107,143 discloses the preparation of thermotropic, wholly-aromatic poly(ester-carbonates) consisting essentially of the residues of hydroxybenzoic acid, hydroquinone, carbonic acid and, depending on the particular poly(ester carbonate), an aromatic dicarboxylic acid. The hydroxybenzoic acid residues and aromatic dicarboxylic acid residues are derived only from the acids or the aryl esters of the acids and the carbonic acid residues are obtained exclusively from a diaryl carbonate.

The process provided by the present invention does not utilize a diaryl carbonate nor does the process require the use of nitrogen-containing heterocyclic compounds. The use of methyl phenyl carbonate in accordance with our novel process is advantageous since it is potentially more economical than diaryl carbonates due to the development of processes whereby methyl phenyl carbonate may be produce from phenol, methanol, oxygen and carbon monoxide, e.g., the process described in Chemical & Engineering News, Nov. 2, 1987. Furthermore, the use of methyl phenyl carbonate rather than diphenyl carbonate in the manufacture of poly(ester-carbonates) results in the liberation of substantially less phenol which is a toxic, hazardous-to-handle material. Methyl phenyl carbonate also is advantageous since it is a liquid under ambient conditions.

The present invention provides a process for the preparation of poly(ester-carbonates) wherein (1) an aromatic diol, (2) methyl phenyl carbonate and (3) an alkyl carboxylate ester component selected from an aromatic dicarboxylate ester, a hydroxy aromatic carboxylate ester or a mixture thereof are contacted in the presence of a transesterification/polycondensation catalyst under transesterification/polycondensation conditions of pressure and temperature. In the practice of the process, a mixture of the above described is heated, typically at ambient or autogenous pressure, to effect reaction of the methyl phenyl carbonate with the aromatic hydroxyl groups, i.e., the hydroxyl groups bonded to a ring carbon atom of an aromatic ring. The temperature then is increased and the mixture is heated at the increased temperature, typically under reduced pressure, until the desired degree of polycondensation has occurred. The polycondensation product may consist of the final poly(ester-carbonate) or it may be a prepolymer which may be ground and further polymerized or polycondensed using conventional solid state polymerization procedures.

The aromatic diols which may be used in the process of the present invention are comprised of dihydroxy aromatic compounds of 6 to about 18 carbon atoms wherein the hydroxy groups are bonded to a ring carbon atom of an aromatic ring. Examples of the aromatic diols include the benzenediols such as 1,4-benzenediol (hydroquinone), 1,3-benzenediol (resorcinol) and benzene diols substituted with alkyl, halogen, phenyl, etc.; naphthalenediols such as 2,6-naphthalenediol; biaryldiols such as 4,4'-biphenol; bis(hydroxyphenyl) ethers such as 4,4'-oxydiphenol; and bis(hydroxyphenyl)alkanes such as 2,2-bis(4-hydroxyphenyl)propane (bisphenol A). The aromatic diol preferably is a benzenediol or a bis(hydroxyphenyl)alkane, especially 1,4-benzenediol and 2,2-bis(4-hydroxyphenyl)propane.

The carboxylate ester reactant may be selected from an aromatic dicarboxylate ester such as a dialkyl ester of an aromatic dicarboxylic acid, a hydroxy aromatic carboxylate ester such a lower alkyl ester of hydroxybenzoic or hydroxynaphthalenecarboxylic acid or a mixture thereof. The alkyl groups may contain up to about 4 carbon atoms although the methyl ester is particularly preferred. Specific examples of the aromatic carboxylate ester reactants include dimethyl 1,4-benzenedicarboxylate (dimethyl terephthalate), dimethyl 1,3-benzenedicarboxylate (dimethyl isophthalate), dimethyl 2,6-naphthalenedicarboxylate, dimethyl 2,7-naphthalenedicarboxylate, dimethyl 4,4'-biphenyldicarboxylate, dimethyl 4,4'-oxydibenzoate, methyl 4-hydroxybenzoate, methyl 3-hydroxybenzoate, methyl 6-hydroxy-2-naphthalene-6-carboxylate and the like.

The ratio of carbonate to ester linkages present in the poly(ester-carbonates) obtained in accordance with this invention can vary significantly depending on the mole ratio of carboxylate ester to aromatic diol used and the particular carboxylate ester employed. The carbonate to ester ratio normally is in the range of about 15:85 to 95:5, preferably about 20:80 to 80:20. Thus, when the carboxylate ester reactant consists of an aromatic dicarboxylate ester, the mole ratio of dicarboxylate ester to aromatic diol may be about 5:100 to 85:100, preferably about 20:100 to 80:100. When the carboxylate ester reactant consists of a hydroxy aromatic carboxylate ester, the mole ratio of hydroxy aromatic carboxylate ester to aromatic diol may be about 5:95 to 85:15, preferably about 20:80 to 80:20. The particular ratio of reactants employed will depend primarily on the particular polymer, including the combination of polymer properties, desired and the particular reactants employed. The poly(ester-carbonates) prepared in accordance with our invention may be crystalline or amorphous. The crystalline polymers typically have a melting point of up to about 380° C., preferably below 340° C.

The amount of methyl phenyl carbonate used normally is at least 1 mole per equivalent of aromatic hydroxyl of the aromatic diol reactant and, if present, the hydroxy aromatic carboxylate reactant. Preferably, a slight to moderate excess, e.g., up to about 50 mole percent excess, of methyl phenyl carbonate is used.

The transesterification/polycondensation catalysts and catalyst systems useful in the practice of our invention are well-known to those skilled in the art of condensation polymers. Examples of such catalysts include titanium, tin, lead and alkaline earth metals, optionally in combination with antimony and/or germanium. The preferred catalyst is titanium, provided as a tetraalkyl titanate, e.g., tetraisopropyl titanate (titanium tetraisopropoxide), or an acyl trialkyl titanate, e.g, acetyl triisopropyl titanate. The concentration of the catalyst can vary substantially depending on a number of factors such as the particular catalyst or catalyst system and/or the transesterification/polycondensation conditions used. Typically, the concentration of the catalyst, calculated as the metal, is in the range of about 25 to 500 parts per million (ppm) based on the theoretical yield of the poly(ester-carbonate) product. Preferably, a titanium catalyst, especially tetraisopropyl titanate, is used in a concentration of about 100 to 400 ppm, calculated as [Ti] and based on the theoretical yield of the poly(ester-carbonate) product.

The transesterification/polycondensation temperatures can vary widely depending on the melting point of the poly(ester-carbonate) product, the thermal stability of the poly(ester-carbonate) product and the method used for the polycondensation stage of the process, i.e., melt-phase or solid-phase polycondensation. Normally, the process is carried out at temperatures in the range of about 180° C. up to a maximum of about 380° C., preferably up to a maximum temperature of about 330° to 350° C.

The initial or transesterification segment of the process, wherein the aromatic hydroxy groups react with methyl phenyl carbonate, may be conducted at temperatures in the range of about 180° to 250° C. and at ambient, or pressures moderately above or below ambient, pressure. After reaction between the hydroxy groups and methyl phenyl carbonate is complete or essentially complete, the temperature is increased to and maintained at about 250° C. up to a maximum of 380° C., preferably 350° C. at ambient and/or reduced pressures, e.g., final polycondensation pressure in the range of about 0.1 to 100 torr, for a period of time, e.g., 10 to 90 minutes, sufficient to give either a low molecular weight prepolymer or the high molecular weight poly(ester-carbonate) product. The prepolymer obtainable at this stage may be cooled, ground to a suitable particle size and submitted to solid phase polycondensation at temperatures in the range of about 250° to 300° C. according to known procedures to produce the high molecular weight poly(ester-carbonate. In some cases, crystallization of the prepolymer, e.g., from acetone or toluene, may be required prior to solid phase polycondensation. Some of the prepolymers obtainable according to our novel process may not be sufficiently crystalline or crystallizable for use in solid phase polycondensation.

The high molecular weight poly(ester-carbonate) product may be obtained using melt phase polycondensation wherein the transesterification product and/or prepolymer is heated at temperatures in the range of about 250° C. up to about 350° C., preferably about 320° to 350° C., during which the pressure is reduced to about 0.5 torr or less. Heating under reduced pressure is continued until the high molecular weight, high melt viscosity poly(ester-carbonate) product is obtained.

The poly(ester-carbonates) produced in accordance with the process of the present invention have inherent viscosities of up to about 1.2 dl/g, usually about 0.3 to 1.0 dl/g, preferably about 0.5 to 0.8, and are useful in the manufacture of various shaped articles such as molded objects and extruded films. The inherent viscosities referred to herein are determined using 0.1 g of poly(ester-carbonate) polymer per 100 mL of a mixture consisting of 40 weight percent p-chlorophenol, 25 weight percent phenol and 35 weight percent 1,1,2,2-tetrachloroethane wherein the polymer is dissolved in the mixture at ambient temperature.

The process provided by the present invention is further illustrated by the following examples. The films referred to in the examples are prepared from the poly(ester-carbonates) by compression molding in a Hannafin press at about 330° to 350° C. for about 30 seconds. Film toughness is assessed by hand creasing the pressed films.

EXAMPLE 1

A 100-mL, single-necked flask is equipped with a metal stirrer, means for maintaining a nitrogen atmosphere or a vacuum within the flask and a molten metal bath which can be raised or lowered to heat the flask or allow it to cool. The following materials are added to the flask:

| | |
|---|---|
| 17.10 g (0.0750 mole) | 2,2-Bis(4-hydroxyphenyl)-propane |
| 10.19 g (0.0525 mole) | Dimethyl terephthalate |
| 25.08 g (0.1550 mole) | Methyl phenyl carbonate |
| 15.0 mL dry toluene | |

The flask and contents are heated to distill off the toluene and azeotropically dry the reactants by slowly immersing the flask in the molten metal bath (maintained at 200° C.) over a period of about 85 minutes. An n-butanol solution (0.153 mL) of tetraisopropyl titanate containing 0.032 g Ti per mL (approximately 200 ppm based on the theoretical yield of polymer) is added to the dried contents of the flask and the metal bath temperature is immediately increased to 250° C. for 3 hours. The contents of the flask are continuously stirred under a nitrogen atmosphere during the heating at 250° C. The metal bath temperature then is increased to 350° C. and maintained at 350° C. for 30 minutes. The pressure within the flask is decreased to 0.2 torr over a period of 5 minutes and the polycondensation mixture is stirred at 350° C. and 0.2 torr for 5 minutes. The poly(ester-carbonate) product thus obtained exhibits a high melt viscosity, an inherent viscosity of 0.63 and gives a tough pressed film.

EXAMPLE 2

The following materials are charged to a flask and the toluene is distilled off to azeotropically dry the reactants according to the procedure described in Example 1:

| | |
|---|---|
| 17.10 g (0.0750 mole) | 2,2-Bis(4-hydroxyphenyl)-propane |
| 10.19 g (0.0525 mole) | Dimethyl isophthalate |
| 25.08 g (0.1550 mole) | Methyl phenyl carbonate |
| 15.0 mL dry toluene | |

An n-butanol solution (0.15 mL) of tetraisopropyl titanate containing 0.032 g Ti per mL (approximately 200 ppm based on the theoretical yield of polymer) is added to the dried contents of the flask and the flask and contents are heated at 250° C. for 3 hours and then at 330° C. for 30 minutes. The pressure then is reduced to 0.1 torr over about 10 minutes and the contents of the flask are continuously stirred under a nitrogen atmosphere 330° C. at 0.1 torr for 2.25 hours. The poly(ester-carbonate) product thus obtained exhibits a high melt viscosity, an inherent viscosity of 0.49 and gives a tough pressed film.

EXAMPLE 3

Example 1 is repeated using the following reactants and catalyst:

| | |
|---|---|
| 17.10 g (0.0750 mole) | 2,2-Bis(4-hydroxyphenyl)-propane |
| 9.15 g (0.0375 mole) | Dimethyl 2,6-naphthalene-dicarboxylate |
| 34.20 g (0.2250 mole) | Methyl phenyl carbonate |
| 200 ppm Ti | | and a final polycondensation temperature of 350° C. for 5 minutes. The poly(ester-carbonate) product thus obtained exhibits a very high melt viscosity and an inherent viscosity of 0.47.

EXAMPLE 4

The following materials are charged to a flask and the toluene is distilled off to azeotropically dry the reactants according to the procedure described in Example 1:

| | |
|---|---|
| 34.20 g (0.150 mole) | 2,2-Bis(4-hydroxyphenyl)-propane |
| 23.28 g (0.120 mole) | Dimethyl terephthalate |
| 50.16 g (0.330 mole) | Methyl phenyl carbonate |
| 25.0 mL dry toluene | |

An n-butanol solution (0.316 mL) of tetraisopropyl titanate containing 0.032 g Ti per mL (approximately 200 ppm based on the theoretical yield of polymer) is added to the dried contents of the flask and the flask and contents are heated at 250° C. for 3 hours and then at 320° C. for 1.5 hours. The pressure then is reduced to about 0.5 torr over about 15 minutes and the polycondensation is continued for 10 minutes. The resulting low melt viscosity prepolymer is cooled and ground through a 3 mm screen in a Wiley mill. The ground prepolymer has an inherent viscosity of 0.25 and is crystallized by slurrying with acetone overnight, filtering and vacuum drying at 100° C. The crystallized prepolymer is further polycondensed in the solid phase by heating at 0.1 torr at 120° C. for 2 hours, at 200° C. for 30 minutes, at 275° C. for 30 minutes and at 290° C. for 4 hours. The poly(ester-carbonate) product thus obtained exhibits an inherent viscosity of 1.17 and gives a very tough pressed film.

EXAMPLE 5

Example 1 is repeated using the following reactants and catalyst:

| | |
|---|---|
| 6.84 g (0.030 mole) | 2,2-Bis(4-hydroxyphenyl)-propane |
| 10.64 g (0.070 mole) | Methyl 4-hydroxybenzoate |
| 21.74 g (0.143 mole) | Methyl phenyl carbonate |
| 200 ppm Ti | | and a final polycondensation temperature of 330° C. for 15 minutes. The poly(ester-carbonate) product thus obtained exhibits a very high melt viscosity, an inherent viscosity of 0.59 and gives a tough pressed film.

EXAMPLE 6

The following materials are charged to a flask and the toluene is distilled off to azeotropically dry the reactants according to the procedure described in Example 1:

| | |
|---|---|
| 10.64 g (0.070 mole) | Methyl 4-hydroxybenzoate- |
| 3.63 g (0.033 mole) | Hydroquinone |
| 21.71 g (0.1426 mole) | Methyl phenyl carbonate |
| 20.0 mL dry toluene | |

An n-butanol solution (0.078 mL) of tetraisopropyl titanate containing 0.032 g Ti per mL (approximately 200 ppm based on the theoretical yield of polymer) is added to the dried contents of the flask and the flask and contents are heated at 200° C. for 2 hours, at 250° C. for 3 hours and then at 330° C. for 30 minutes. The pressure then is reduced to 0.1 torr over about 10 minutes and the contents of the flask are continuously stirred under a nitrogen atmosphere at 330° C. at 0.1 torr for 1 hour. The poly(ester-carbonate) product thus obtained exhibits a high melt viscosity, an inherent viscosity of 0.77 and gives a tough pressed film.

EXAMPLE 7

The following materials are charged to a flask and the toluene is distilled off to azeotropically dry the reactants according to the procedure described in Example 1:

| | |
|---|---|
| 10.64 g (0.070 mole) | Methyl 4-hydroxybenzoate- |
| 5.58 g (0.030 mole) | 4,4'-Biphenol |
| 20.75 g (0.1365 mole) | Methyl phenyl carbonate |
| 15.0 mL dry toluene | |

Tetraisopropyl titanate containing (0.0355 g; (approximately 400 ppm Ti based on the theoretical yield of polymer) is added to the dried contents of the flask and the flask and contents are heated at 250° C. for 3.25 hours and then at 330° C. for 1.25 hours. The pressure then is reduced to 0.3 torr over about 10 minutes and the contents of the flask are continuously stirred under a nitrogen atmosphere at 330° C. at 0.3 torr for 3 hours. The poly(ester-carbonate) product thus obtained gives a tough pressed film and exhibits low solubility in the solvent mixture used to determine inherent viscosity.

The invention has been described in detail with particular reference to preferred embodiments thereof, but it will be understood that variations and modifications can be effected within the scope and spirit of the invention.

We claim:

1. Process for the preparation of a poly(ester-carbonate) which comprises contacting (1) an aromatic diol, (2) methyl phenyl carbonate and (3) a carboxylate alkyl ester component selected from an aromatic dicarboxylate ester, a hydroxy aromatic carboxylate ester or a mixture thereof in the presence of a transesterification/polycondensation catalyst under transesterification/polycondensation conditions of pressure and temperature.

2. Process according to claim 1 wherein the aromatic diol is a benzenediol, a naphthalenediol, a biphenyldiol, a bis(hydroxyphenyl)alkane or a mixture thereof and the carboxylate ester component is a benzenedicarboxylate ester, a naphthalenedicarboxylate ester, a hydroxybenzoate ester or a mixture thereof and at least 1 mole of methyl phenyl carbonate is used per equivalent of aromatic hydroxy group of the aromatic diol and, if present, the hydroxybenzoate ester reactants.

3. Process according to claim 1 wherein the process is carried out at temperatures of about 180° to 380° C. and pressures of about ambient to 0.1 torr.

4. Process for the melt phase preparation of a poly(ester-carbonate) which comprises contacting (1) an aromatic diol selected from a benzenediol, a naphthalenediol, a biphenyldiol, a bis(hydroxyphenyl)alkane or a mixture thereof, (2) methyl phenyl carbonate and (3) an alkyl carboxylate ester component selected from a benzenedicarboxylate ester, a naphthalenedicarboxylate ester, a hydroxybenzoate ester or a mixture thereof, in the presence of a transesterification/polycondensation catalyst, wherein (i) at least 1 mole of methyl phenyl carbonate is used per equivalent of aromatic hydroxy group of the aromatic diol and, if present, the hydroxybenzoate ester reactants and (ii) the process is performed in a first stage at temperatures of about 180° to 250° C. at about ambient pressure and in a second stage at temperatures of about 320° to 350° C. at pressures of ambient to 0.1 torr.

5. A process according to claim 4 which comprises contacting (1) 2,2-bis(4-hydroxyphenyl)propane, (2) methyl phenyl carbonate and (3) dimethyl 1,3-benzenedicarboxylate, dimethyl 1,4-benzenedicarboxylate, or a mixture thereof.

6. A process according to claim 4 which comprises contacting (1) 1,4-benzenediol, (2) methyl phenyl carbonate and (3) dimethyl 1,3-benzenedicarboxylate, dimethyl 1,4-benzenedicarboxylate, or a mixture thereof.

* * * * *